June 16, 1931.  H. W. ZIMMERMAN  1,810,513
SHACKLE JIMMY
Filed June 21, 1928
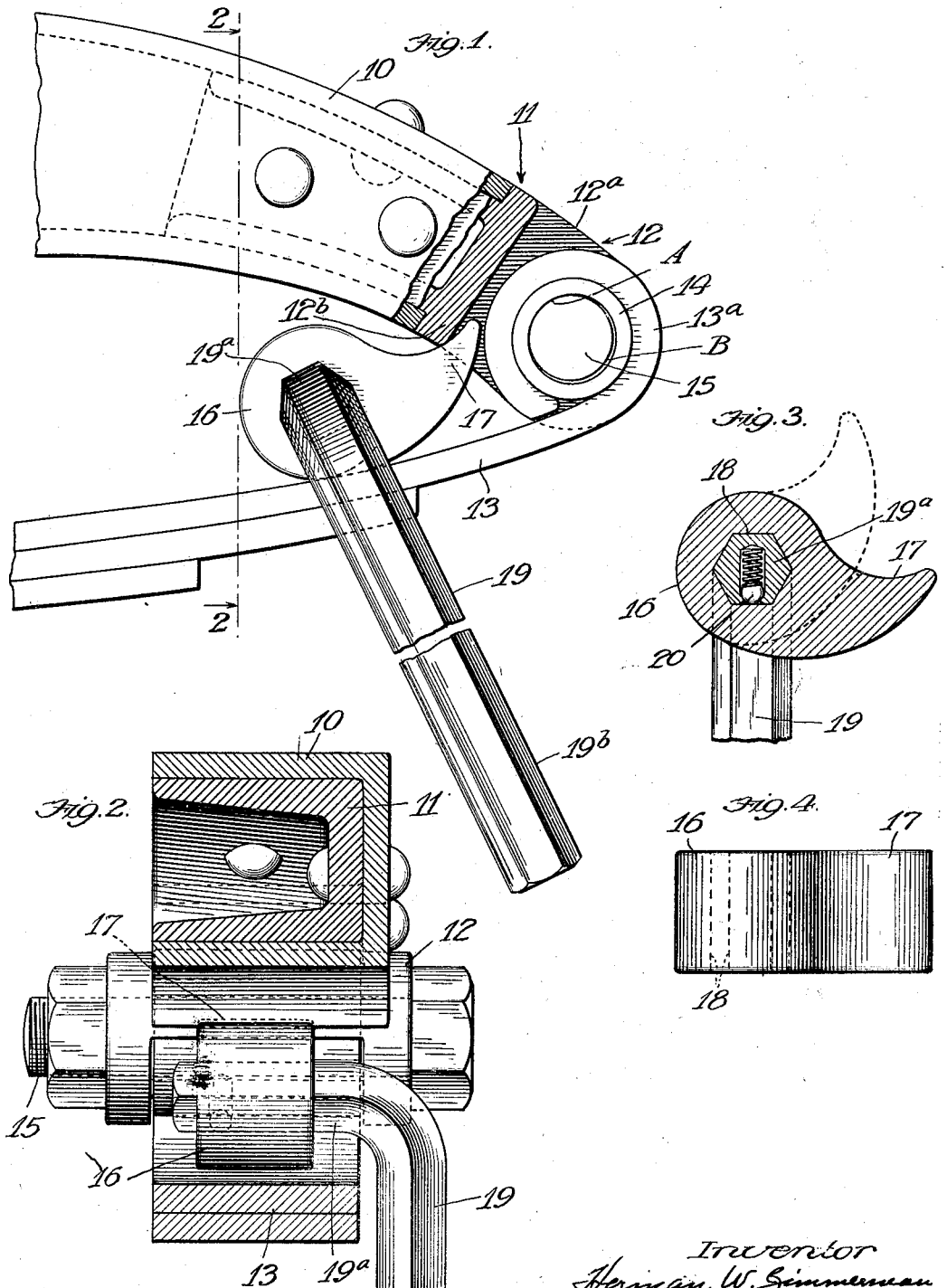

Patented June 16, 1931

1,810,513

UNITED STATES PATENT OFFICE

HERMAN W. ZIMMERMAN, OF CHICAGO, ILLINOIS, ASSIGNOR TO AUTOMOTIVE MAINTENANCE MACHINERY CO., OF CHICAGO, ILLINOIS, A CORPORATION OF ILLINOIS

SHACKLE JIMMY

Application filed June 21, 1928. Serial No. 287,337.

My invention relates to a shackle jimmy which is primarily adapted for supporting and adjusting the hinge-action spring shackles employed in the suspension of vehicle springs for inspection, repairs, replacements, lubrication, etc., of the same. My invention also has great utility in numerous other instances where it is desired to support and adjust parts of the vehicle which are not readily accessible with ordinary tools without the disassembly of certain of the vehicle parts.

It is well known that the load of the vehicle frame (and the parts supported thereby) is disposed substantially at only one point upon the shackle bolts and that the contacting surfaces of the shackle parts are so tightly seated together at the so-called load-points that it is practically impossible to force a lubricant into the shackle bushings and around the shackle bolts and upon the load points where lubrication is most needed and where wear takes place to a greater extent. The load disposed upon the shackles is quite severe and, as the vehicle moves along, the shackle parts are practically always in motion. Consequently, wear tends to take place quite rapidly in the shackle structures, and this wearing condition is greatly aggravated due to the lack of proper lubrication as above more particularly mentioned.

The principal object of my invention is to provide for the proper lubrication of these shackle structures. To that end, my invention provides a means which may be easily and quickly associated with the shackle structures for adjusting the same to free the shackle parts so that a lubricant may be freely forced into the shackle bushing around the shackle bolts to uniformly distribute such lubricant throughout the shackle parts, particularly at the load-wear-points, whereby the wear-tendency of the shackles is reduced to a minimum.

These shackle structures are usually neglected and are not subjected to proper inspection and care in most instances due to the general inaccessibility of the shackle parts. This is true also as to other of the parts of a motor vehicle, such as the kingpin structure, which should be frequently inspected and lubricated. Another object of my invention is to provide a means of the foregoing character which may be placed in and adjusted in closely confined, and otherwise inaccessible, spaces without disassembly of any of the vehicle parts, such means including a handle structure which may be readily and quickly adjusted to various positions whereby the device may be conveniently and positively manipulated from any position without interference from adjacent vehicle parts and equipment.

An additional object is to provide an adjusting device for carrying out the foregoing objects which is simple in construction, exceedingly cheap to manufacture, and which is exceedingly strong and durable.

Other objects and advantages have to do with details and arrangements of parts which will be more particularly pointed out as this description progresses and which will be obvious by reference to the drawings wherein,—

Figure 1 is a side view of the forward end of the frame and front spring of a motor vehicle, having my invention applied thereto, certain of the parts being shown broken away and other parts being shown in section to more clearly illustrate my invention;

Fig. 2 is a vertical section taken substantially on line 2—2 of Fig. 1;

Fig. 3 is a vertical section taken through the jimmy device, the engaging pawl of this device being shown in full lines in one position and in dotted lines in another position to which it may be adjusted; and Fig. 4 is a top plan view of the structure shown in Fig. 3.

I have chosen to illustrate my invention as associated with the shackle structure connecting the forward ends of an automobile frame and front springs. With particular reference to Fig. 1, the forward end of the frame 10 fixedly carries a block 11 having a yoked extension 12, the arms 12ª of which hingedly receive the front-end eye 13ª of the front spring 13. The connection between the yoke 12 and spring eye is accomplished in the well known way by a so-called shackle structure comprising a shackle bushing 14 and shackle bolt 15.

As will be noted in Figure 1, the frame load is substantially all disposed upon the shackle bolt 15 at the point indicated at A while the opposite space between the shackle bolt and bushing, indicated at B, is practically free. Because of the foregoing, unless provided against, when a lubricant is forced into the shackle bushing 14, it flows freely into and through the space B, but it does not reach the point A and, consequently, the latter point (where lubrication is most needed) is not lubricated and wear takes place there very rapidly. As stated hereinabove, these factors are generally overlooked and the wear condition is aggravated due to lack of proper care.

My invention provides for the proper lubrication and care of the shackles and other parts of vehicles and to that end I provide what I may term a "shackle jimmy". Specifically, I provide a pawl-shaped device having a cylindrically-shaped pawl-head 16 (Figs 3 and 4) from which the pawl-tongue 17 projects tangentially. The pawl-head and pawl-tongue are of such size and length, respectively, that the device may be placed in very small spaces which are not readily accessible. The device is made of a strong and durable metal and its shape adds to its strength and its great utility.

The pawl-head 16 is not adapted for fixed engagement with the parts to be adjusted, but finds a roll-bearing support upon one of the parts while the pawl-tongue 17 grippingly engages the other part to effect relative spreading movements of the same. To provide for ease in adjustment of the device the pawl-head is provided with an irregularly shaped (preferably hexagonal) axial opening 18 which receives the short arm 19ª of a right angled handle 19 which is shaped in cross-section similarly to such opening 18. The long arm 19ᵇ of this handle may be of any desired length for accessibility and to give the desired leverage. The short arm 19ª is freely insertable in the opening 18, but is held frictionally engaged therein by a spring-pressed ball 20 mounted in a suitable slot in that part of the arm which enters the pawl-head opening. This arrangement permits of adjustment of the handle to the pawl head in a plurality of angular positions with respect to the pawl tongue 17, whereby the handle may always be adjusted to a position where it may be readily grasped and operated and where pressure may be more readily and effectively applied thereto to get the desired leverage to adjust the shackle and shackled parts as will be explained more fully hereinafter. This handle may be readily adjusted to a position wherein a pulling force may be applied or to a position for pushing, whichever is most convenient and desirable.

In the use of my invention in the manner illustrated in Fig. 1, the pawl-head 16 is placed upon the upper leaf of front spring 13 with the pawl-tongue extending arcuately upward into engagement with the base 12ᵇ of the yoke 12. The handle 19 is adjusted to the head for a pulling action (as shown) or it may be adjusted approximately 90° or more in an anti-clockwise direction for a pushing action. By oscillating the handle 19 to spread the frame and spring apart and remove the weight of the frame from the shackle bolt, one may readily inspect and determine the condition of the shackle. Also, by so adjusting the shackled parts, the shackle bolt may be made sufficiently free in the shackle bushing that when a lubricant is applied to the shackle it will find its way uniformly around the shackle bolt and to the point A where lubrication is most needed. As the lubricant is applied the jimmy device may be oscillated to move the shackle bolt back and forth in the bushing to aid in the foregoing lubricating action.

Practice has demonstrated that my invention is of great utility in general inspection, lubrication and repair of automobiles. It has been found to be exceedingly useful in inspecting and lubricating the king-pin structures of automobiles. In present automotive constructions the front wheels are usually supported with their lower parts inclined inwardly. This arrangement naturally imposes a condition between the king-pin and its bushing similar to that between the shackle bolt and bushing as illustrated in Figure 1. More particularly, the upper part of the king-pin is forced outwardly against its bushing and the lower part of such pin is forced inwardly against its bushing, with the result that a lubricant applied thereto does not find its way to the load-contacting points just mentioned, and excessive wear takes place. By my invention, regardless of the difficulty of access to the king-pin structure and its associated parts, the king-pin may be freed in its bushing sufficiently for the lubricant to pass uniformly therearound when it is applied thereto.

While I have illustrated only one embodiment of my invention, it will be understood that various changes in details and arrangements of parts may be resorted to without departing from the spirit and scope of my invention as defined by the claims which follow.

I claim:

1. A device adapted for adjusting a vehicle spring shackle including a shackle bolt, and shackle bushing, and for effecting relative movements of the shackled frame and spring posts for inspection, repair, lubrication and the like, of such parts, which includes a cylindrical body of such size as to be readily inserted between the shackled spring and frame parts close to the shackle with its body seated on the spring, a pawl-like tongue extending tangentially from said body and of such shape and length as to securely interlock with the shackled parts, and a lever-handle having an adjustable connection with said body for effecting spreading movements of the shackled parts by rocking said body on the spring which supports it.

2. A device adapted for the separation-movement of two parts which comprises a cylindrical body having an irregularly-shaped axial opening therein, said body being adapted for support by one of said parts to rock thereon, a tapered arcuate-shaped extension integral with and projecting tangentially from said body and adapted for non-slip engagement with the other of said parts, and a handle having a part shaped similarly to and inserted in said body opening for applying rotary movement to said body upon said one part to move said parts away from each other.

3. In an adjusting device of the character described, a cylindrical body having an axial opening therein, a pawl-tongue extending arcuately outward from the outer surface of said body, a handle non-rotatably secured in said body opening, said handle being arranged for a connection to said body in a plurality of different angular positions with respect to said pawl-tongue, said body being adapted for rolling engagement with one part to be adjusted and said pawl-tongue being adapted for pawl-like engagement with another part to be adjusted.

4. In a device of the character described, a body including an opening and a curved peripheral surface and having a hook-shaped tongue projecting therefrom, said body being shaped to seat and rock upon one of the parts to be adjusted, and said tongue being adapted to non-slip engage the other of the parts to be adjusted and an adjustable handle detachably mounted in said opening and arranged to effect a rotary-rock movement of said body.

In testimony whereof, I have subscribed my name.

HERMAN W. ZIMMERMAN.